United States Patent [19]

Uppal

[11] Patent Number: 5,799,694
[45] Date of Patent: Sep. 1, 1998

[54] STEERING CONTROL UNIT

[75] Inventor: Sohan L. Uppal, Bloomington, Minn.

[73] Assignee: Eaton Corporation, Cleveland, Ohio

[21] Appl. No.: 728,229

[22] Filed: Oct. 10, 1996

[51] Int. Cl.$^6$ .............................. F15B 9/10; F15B 13/10
[52] U.S. Cl. .................... 137/625.24; 60/384; 91/467; 418/61.3
[58] Field of Search .................... 60/384; 91/467; 137/625.24; 418/61.3

[56] References Cited

U.S. PATENT DOCUMENTS

| | | |
|---|---|---|
| 3,059,717 | 10/1962 | Moyer et al. |
| 3,288,078 | 11/1966 | Monroe et al. |
| 3,443,378 | 5/1969 | Monroe et al. |
| 3,561,893 | 2/1971 | Baatrup |

*Primary Examiner*—Gerald A. Michalsky
*Attorney, Agent, or Firm*—L. J. Kasper

[57] ABSTRACT

A fluid controller (11) of the type comprising a rotatable spool valve (31) and a relatively rotatable follow-up sleeve valve (33), in which fluid flows through a fluid meter (15) of the type in which a star member (39) orbits and rotates as fluid flows through the meter (15). The rotation of the star (39) is transmitted to the sleeve valve (33) to provide follow-up movement thereto. In accordance with the present invention, the star (39) defines a set of internal teeth (41) and a terminal portion (42) of the sleeve valve (33) extends axially into the star and defines a set of external teeth (43), in driven engagement with the internal teeth (41). As a result of the follow-up arrangement of the invention, the need for the conventional drive shaft and transverse pin is eliminated, the spool and sleeve can have smaller diameters, and the overall fluid controller can be smaller, less complicated, and less expensive.

10 Claims, 5 Drawing Sheets

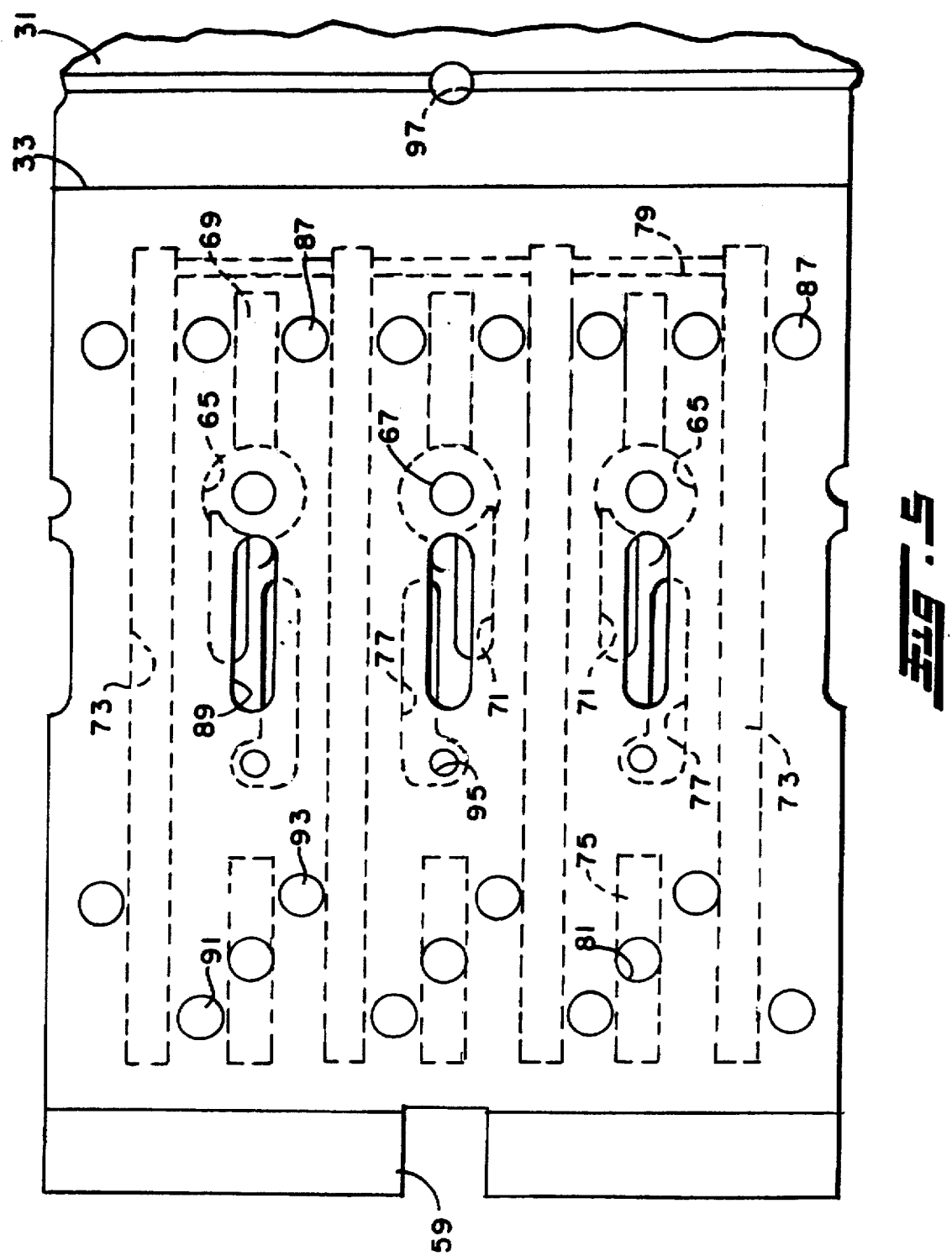

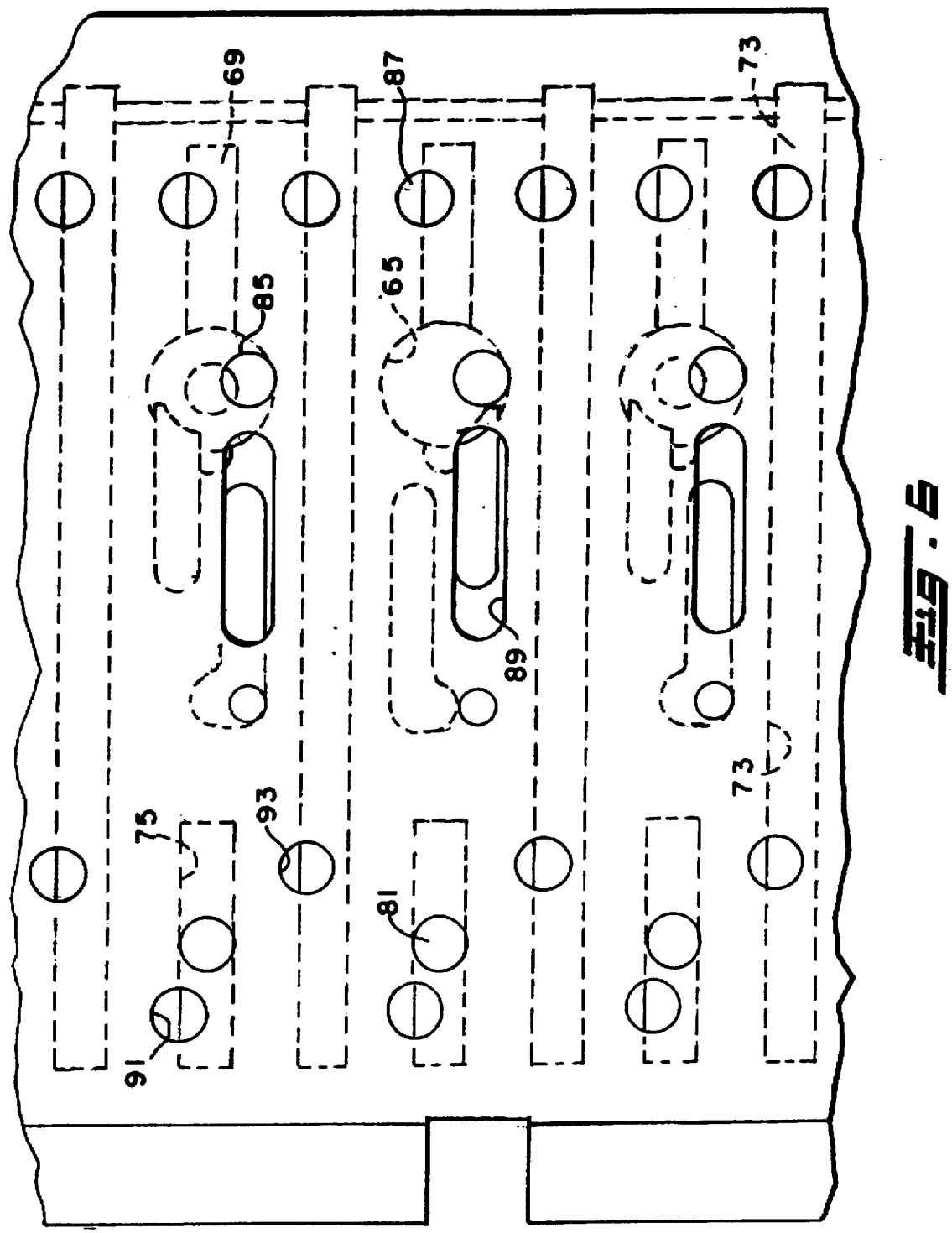

STEERING CONTROL UNIT

BACKGROUND OF THE DISCLOSURE

The present invention relates to fluid controllers of the type used to control the flow of fluid from a source of pressurized fluid to a fluid pressure operated device, such as a vehicle steering cylinder.

A typical fluid controller of the type to which the present invention relates includes a housing, which defines various fluid ports, and further includes a fluid meter and valving, operable in response to an input, such as the rotation of the vehicle's steering wheel. The valving conventionally includes a primary spool valve, rotated by the steering wheel, and a follow up sleeve valve, with the relative rotational displacement of the spool and sleeve valves being determined by the steering input torque. The rotational displacement between the spool and sleeve valves determines the flow through the valving, and therefore, the flow to the steering cylinder.

The typical controller also includes an arrangement for imparting follow up movement to the valving, and specifically to the follow up sleeve valve, in response to the flow of fluid through the fluid meter. The fluid meter normally comprises a gerotor gear set, in which the internally toothed ring member is stationary, and the externally toothed star member orbits and rotates within the ring member as fluid flows through the meter, an is measured or metered thereby. Typically, follow up movement is transmitted from the orbiting and rotating star member to the follow up sleeve valve by means of a main drive shaft and a diametrally-oriented pin which passes through oversized holes in the spool, but is received in close fitting holes in the sleeve. Thus, the rotational component of the orbital and rotational motion of the star member is transmitted into rotational follow up motion of the sleeve valve. Such a follow-up arrangement is well known in the art, and is illustrated and described in U.S. Pat. No. 4,336,687, assigned to the assignee of the present invention and incorporated herein by reference.

Although the follow up arrangement of the prior art functions satisfactorily, and has been in use for many years, it does involve certain disadvantages and limitations. For example, the prior art follow up mechanism requires the provision of the drive shaft and drive pin, which serve no other purpose than to achieve the follow up motion of the sleeve valve. In addition, because the main drive shaft extends from the gerotor star to a location toward the forward end of the spool and sleeve, the drive shaft is disposed within the hollow spool valve. The end of the main drive shaft in splined engagement with the gerotor star orbits and rotates therewith, such that the inside diameter of the hollow spool valve must be large enough to accommodate not only the diameter of the main drive shaft, but also the eccentric movement of the gerotor star. As a result, the typical spool and sleeve valves in a fluid controller are larger in diameter than would be desirable, as far as minimizing leakage is concerned, and quite often, the spool and sleeve valves have a thinner dimension, radially, than is desirable, as fas as withstanding the fluid pressures involved.

In addition, the relatively large size of the spool and sleeve valves in the prior art fluid controller limits the back pressure at which the controller can operate. In many vehicle steering systems, it would be quite desirable to be able to use the controller fluid return line as the input to a downstream, auxiliary fluid pressure device.

SUMMARY OF THE INVENTION

Accordingly, it is an object of the present invention to provide an improved fluid controller of the type having a primary, spool valve and a follow up, sleeve valve, wherein the above-described disadvantages of the prior art fluid controller are overcome.

It is a more specific object of the present invention to provide a fluid controller of the type described in which the typical mechanism for transmitting follow-up movement to the sleeve valve is eliminated, and instead, there is a more simple and direct transmission of follow-up movement from the orbiting and rotating gerotor star to the sleeve valve.

The above and other objects of the invention are accomplished by the provision of a controller operable to control the flow of fluid from a source of pressurized fluid to a fluid pressure operated device. The controller is of the type including housing means defining an inlet port for connection to the source, a return port for connection to a reservoir, and first and second control fluid ports for connection to the fluid pressure operated device. Valve means is disposed in the housing means and comprises a primary, rotatable valve member and a cooperating, relatively rotatable follow up valve member, the primary and follow-up valve members defining a neutral position and a rotary operating position in which the primary and follow up valve members are relatively rotatably displaced. The housing means and the valve means cooperate to define a main fluid path communicating between the inlet port and the first control fluid port, and between the second control fluid port and the return port, when the valve members are in the rotary operating position. Fluid actuated means is included for imparting follow up movement to the valve means proportional to the volume of fluid flow therethrough, the fluid actuated means including a stationary internally toothed ring member, and an externally toothed star member having rotational movement relative to the ring member.

The controller is characterized by the follow up valve member including a terminal portion disposed immediately adjacent the externally toothed star member. The star member and the follow up valve member include coupling means operable in response to the rotational movement of the star member to transmit a rotational follow up movement to the follow up valve member.

BRIEF DESCRIPTION OF THE DRAWINGS

FIG. 5 is an overlay view of the valving of the fluid controller, on a larger scale than in FIG. 1, and in the neutral position.

FIG. 6 is an enlarged, fragmentary, overlay view of the valving shown in FIG. 5, displaced from the neutral position of FIG. 5 to an operating position.

DESCRIPTION OF THE PREFERRED EMBODIMENT

Figure 1:
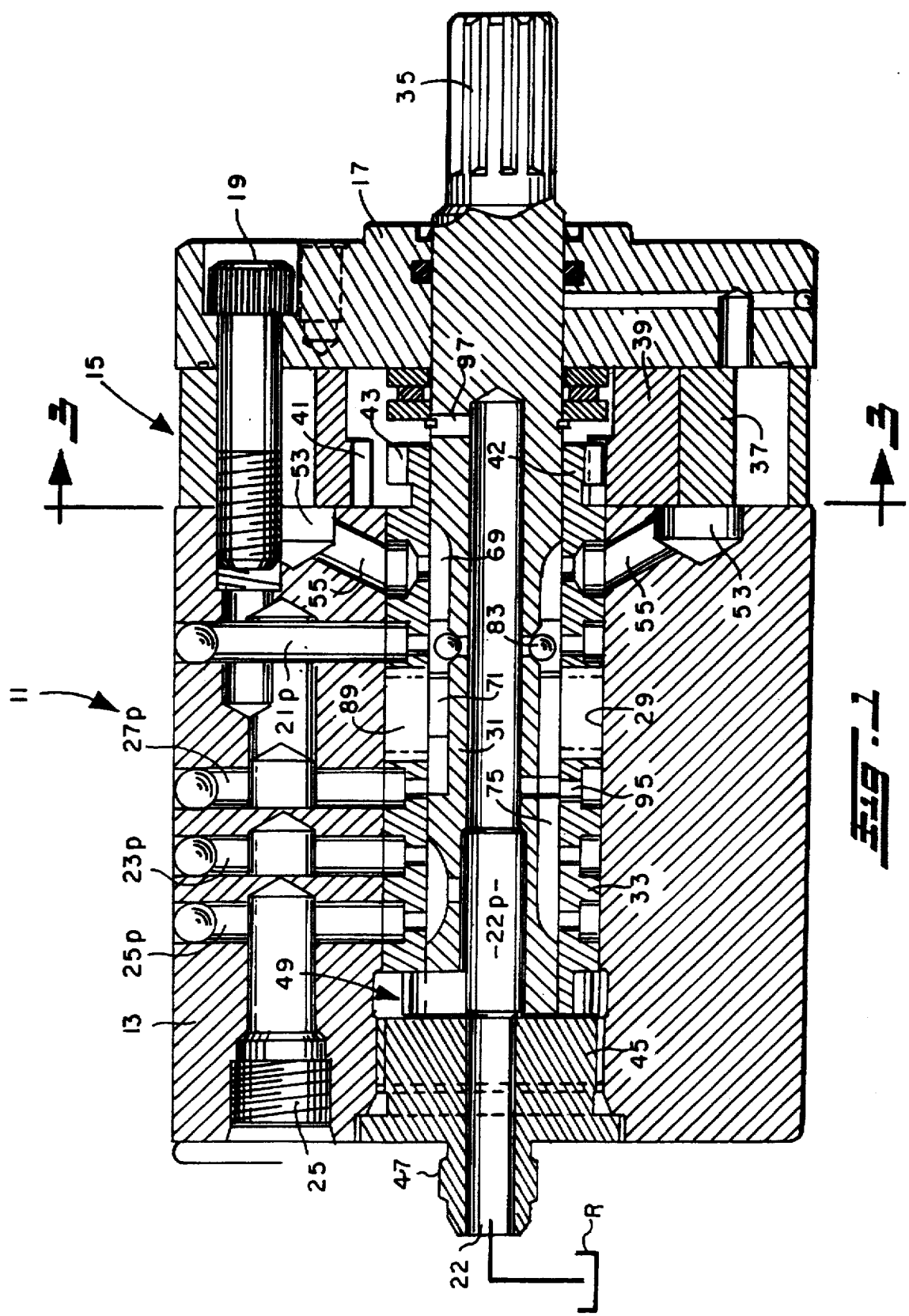
FIG. 1 is an axial cross-section of a fluid controller made in accordance with the present invention.

Referring now to the drawings, which are not intended to limit the invention, FIG. 1 illustrates a fluid controller, generally designated 11, which is made in accordance with the present invention. The fluid controller 11 may utilize many of the teachings illustrated and described in U.S. Pat.

No. Re. 25,126, assigned to the assignee of the present invention and incorporated herein by reference. However, the fluid controller 11 of the present invention embodies a novel overall arrangement which makes the fluid controller simpler, more compact, and less expensive than prior art fluid controllers, while being capable of higher performance.

The fluid controller 11 comprises several sections, including a valve housing section 13, a section comprising a fluid meter 15, and a front end cap 17. These sections are held together in tight sealing engagement by means of a plurality of bolts 19 (only one of which is shown in each of FIGS. 1 and 3), and which are in threaded engagement with the valve housing section 13.

Figure 2:
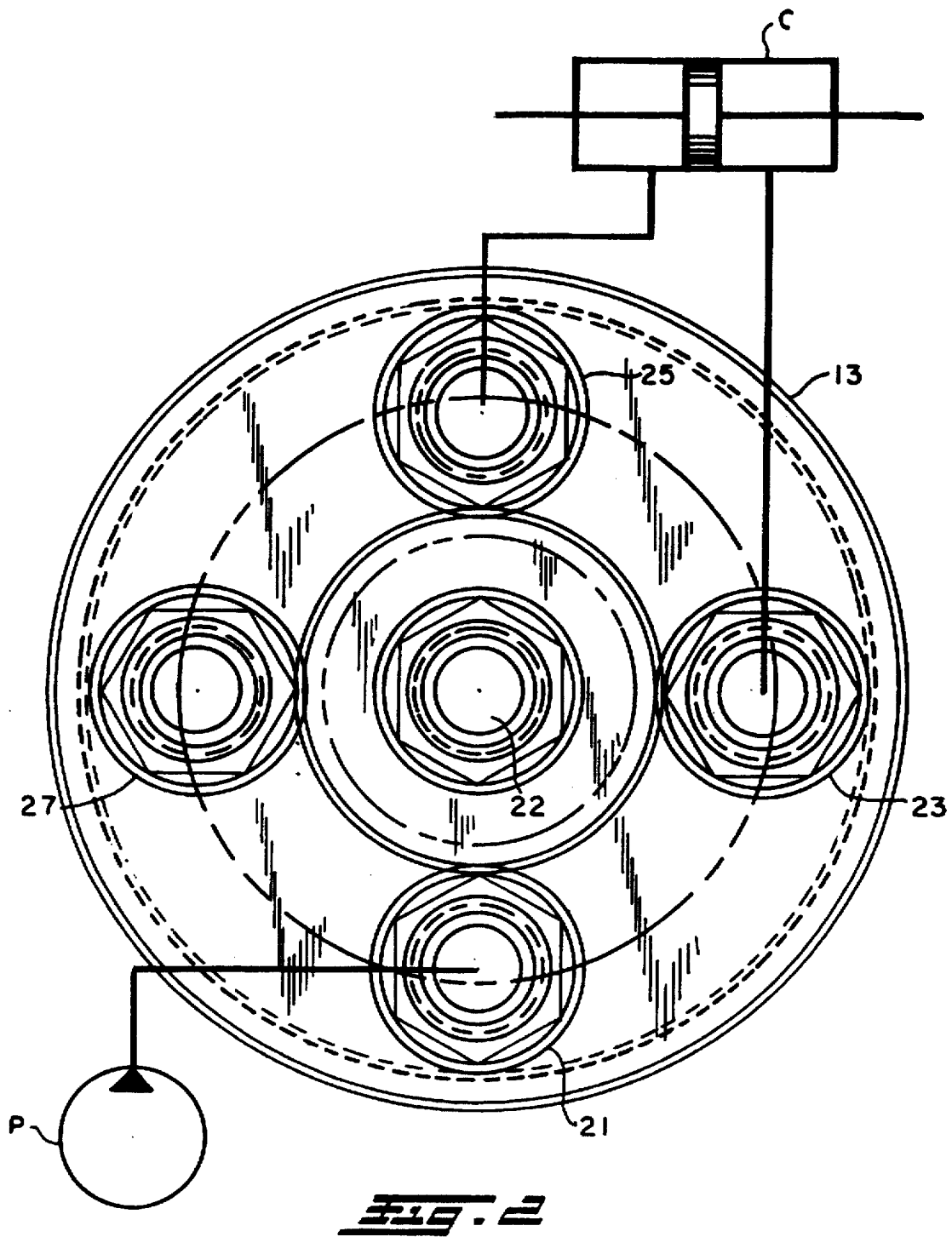
FIG. 2 is a left end plan view of the fluid controller of FIG. 1.

Referring now to FIG. 2, in conjunction with FIG. 1, the valve housing section 13 defines a fluid inlet port 21 (which receives pressurized fluid from a pump P), and a fluid return port 22, which is typically connected to a system reservoir R, but may also be connected to a downstream, auxiliary fluid pressure device (not shown herein), and it will be understood that references hereinafter to a "reservoir" will include such downstream devices. The valve housing section 13 also defines a pair of control fluid ports 23 and 25 (which communicate fluid to and from a vehicle steering cylinder C), and a power beyond fluid port 27. Referring again primarily to FIG. 1, the valve housing section 13 also defines a valve bore 29, and rotatably disposed therein is the controller valving which comprises a primary, rotatable valve member 31 (also referred to hereinafter as the "spool"), and a cooperating, relatively rotatable follow up valve member 33 (also referred to hereinafter as the "sleeve"). At the forward end of the spool valve 31 is a set of external splines 35 which provide for direct mechanical connection between the spool 31 and a vehicle steering wheel (not shown herein). The spool 31 and sleeve 33 will be described in greater detail subsequently.

Figure 3:
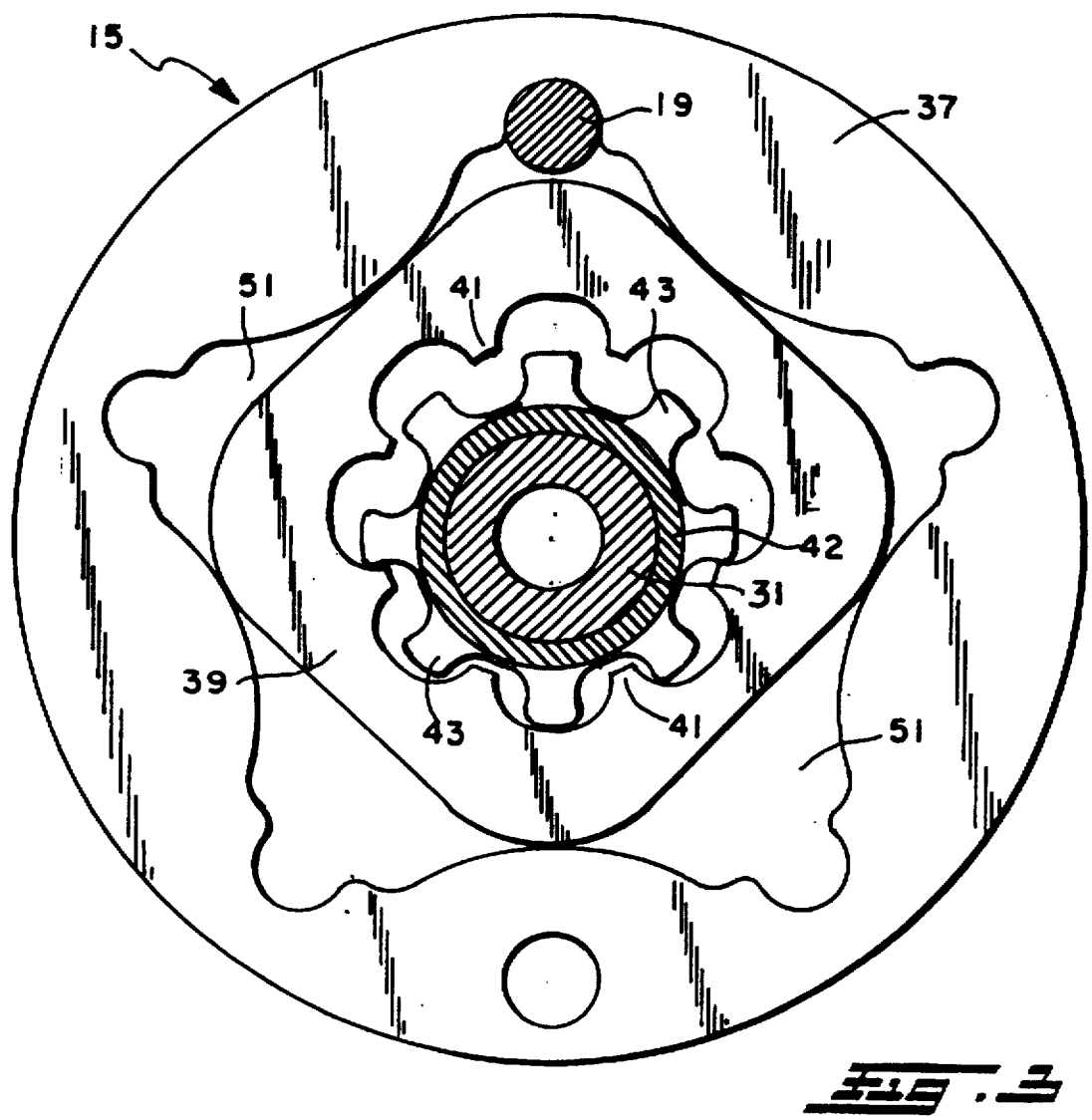
FIG. 3 is a transverse cross-section, taken on line 3—3 of FIG. 1, illustrating the fluid meter and the follow up mechanism of the present invention.

Referring now primarily to FIG. 3, the fluid meter 15 may be of the general type well known in the art, and in the subject embodiment, includes an internally toothed ring member 37, and an externally toothed star member 39. The star member 39 is eccentrically disposed within the ring member 37, for orbital and rotational movement relative thereto. The star member 39 defines a set of internal teeth 41, and in engagement therewith, and disposed about a forward terminal portion 42 of the sleeve valve 33 is a set of external teeth 43, the function of which will be described subsequently.

Pressurized fluid flows through the various ports and passages defined by the valve housing section 13, the spool 31, and the sleeve 33, then flows through the fluid meter 15, causing orbital and rotational movement of the star 39 within the ring 37. The rotational component of the movement of the star 39 is transmitted by means of the teeth 41 and 43 into follow up, rotational movement of the sleeve 33, to maintain a particular relative displacement between the spool 31 and the sleeve 33. The particular relative displacement (referred to hereinafter as an "operating position"), is generally proportional to the rate of rotation of the steering wheel, i.e., the rate of rotation of the spool 31. It is preferred that the number of the internal teeth 41 be equal to the number of the external teeth 43, so that the follow-up movement transmitted to the sleeve valve 33 will be equal to the rotational movement of the star 39, i.e., one revolution of the star 39 results in one revolution of the sleeve valve 33.

The valve housing section 13 defines a plurality of passages which communicate between the various ports identified previously, and the valve bore 29. Each of the passages includes an axially extending portion, as is shown in FIG. 1 communicating with the control port 25. In addition, each of the passages includes a radially extending portion, and it is generally those portions which are all illustrated in FIG. 1, and will be described herein. Extending from the inlet port 21 to the bore 29 is a fluid passage 21p, while a fluid passage 22p extends axially through most of the length of the spool 31. A pair of fluid passages 23p and 25p provide communication between the control fluid ports 23 and 25, respectively, and the valve bore 29. Finally, a fluid passage 27p extends from the valve bore 29 to the power beyond port 27.

In threaded engagement with internal threads defined by the valve housing section 13 is a plug member 45, which defines a rearward portion of the fluid passage 22p. The plug member 45 may either define the return port 22 or, as shown in FIG. 1, may include an external fitting 47 which defines the return port 22. The rearward ends of the spool 31 and sleeve 33 are disposed immediately adjacent a forward surface of the plug member 45. At that location is a centering spring arrangement, generally designated 49, which will be described subsequently in greater detail.

The toothed interaction of the star 39, orbiting and rotating within the ring 37, defines a plurality of expanding and contracting fluid volume chambers 51, and adjacent each such chamber 51, the valve housing section 13 defines a fluid port 53 (see FIG. 1). The valve housing section 13 further defines a plurality of angled bores 55 (two of which are shown in FIG. 1), each of which is in open communication with one of the fluid ports 53, and with the valve bore 29. It is one benefit of the present invention that the complicated and expensive machining of annular internal grooves (i.e., within the valve bore) is eliminated. Instead, each of the passages 21p, 23p, 25p, 27p is drilled radially from the outside, and each of the angled bores 55 is drilled from adjacent the forward surface of the valve housing section 13.

Figure 4:
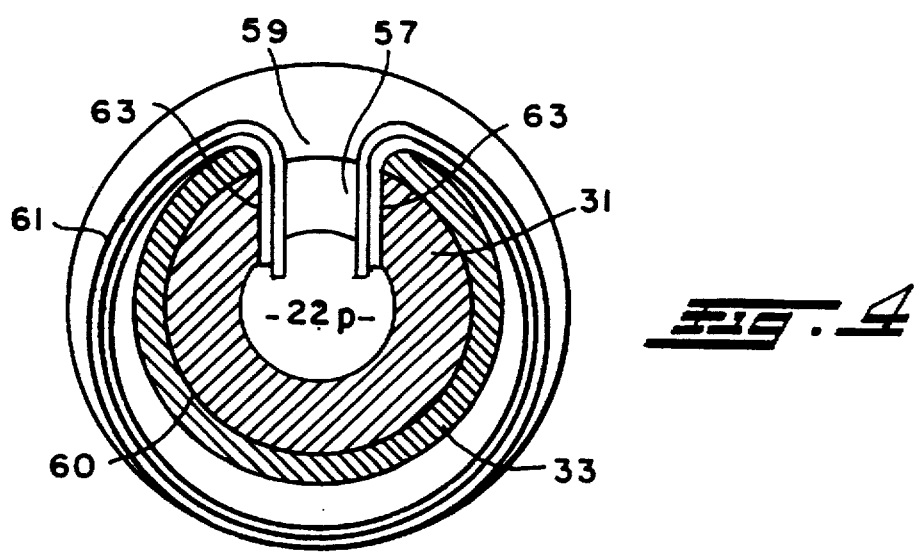
FIG. 4 is a transverse cross-section taken through the centering spring arrangement of the present invention.

Referring now to FIG. 4, in conjunction with FIG. 1, the centering spring arrangement 49 will be described. Adjacent the rearward end of the spool 31, there is a slot or opening 57, and similarly, the sleeve 33 defines a slot 59. In addition, the sleeve 33 has a reduced diameter portion 60, about which is disposed a spring member having a generally annular portion 61 and a pair of radially inwardly extending tab portions 63. When the spool 31 and the sleeve 33 are in the neutral position, relative to each other, the tab portions 63 engage the sides of the slots 57 and 59. As is generally well known in the art, after a steering operation has been completed, with the spool 31 rotated further in the direction of steering than the sleeve 33, the radially inner ends of the tab portions 63 will be displaced from the position shown in FIG. 4, but when the operator stops applying steering torque to the spool 31, the tab portions 63 of the spring member 61 bias the spool 31 back toward its neutral position, relative to the sleeve 33 (i.e., toward the relative position shown in FIG. 4). It will be understood by those skilled in the art that FIG. 4 represents only the relative position of the spool and sleeve when they are in neutral, and the spool and sleeve together may be in any rotational orientation.

Referring now primarily to FIGS. 5 and 6, the valving arrangement of the present invention will be described in some detail. Those elements defined by the spool 31 are illustrated in dashed lines, whereas those elements defined by the sleeve 33 are illustrated in solid lines. The spool 31 defines a plurality of cylindrical recesses 65, each of which includes a radial bore 67 communicating with the fluid passage 22p. Extending to the right from each of the recesses 65 is an axial slot 69, while extending to the left from each of the recesses 65 is an axial slot 71.

Disposed circumferentially between each adjacent pair of recesses 65 is a relatively longer axial slot 73, and disposed circumferentially between each adjacent pair of slots 73 is a relatively shorter axial slot 75. Disposed adjacent each of the recesses 65 is a power beyond slot 77, the function of which will be described subsequently. Toward the right end in FIG. 5, the long axial slots 73 are interconnected by an annular groove 79, which also serves a radial pressure balancing function. The axial slots 69, 71, 73, 75 and 77, as well as the annular groove 79, are all formed only on the surface of the spool 31. However, each of the short axial slots 75 includes a radial bore 81 which communicates to the return port 22 through the fluid passage 22p. Also, as noted previously, the radial bore 67 communicates with the passage 22p, but as may best be seen in FIG. 1, each of the radial bores 67 includes a generally conical seat, against which is seated a ball check valve 83.

Referring now primarily to FIGS. 1, 5 and 6, the sleeve valve 33 defines a plurality of pressure ports 85, which are in continuous fluid communication with the inlet port 21. The sleeve 33 further defines a plurality of meter ports 87 which, during a steering operation, are in commutating fluid communication with the angled bores 55, in a manner well known to those skilled in the art.

The sleeve valve 33 defines an axially elongated opening 89, adjacent each of the pressure ports 85, the openings 89 extending through the full radial extent of the sleeve 33 (primarily for ease of manufacture), as may best be seen FIG. 1. The sleeve 33 further defines a plurality of operating ports 91, which are in continuous fluid communication with the control port 25, and a plurality of operating ports 93, which are in continuous fluid communication with the control port 23. Finally, the sleeve 33 defines a plurality of power beyond ports 95, which are in continuous fluid communication with the power beyond port 27. As may best be seen in FIG. 1, the ports 85, 91, 93 and 95 are in fluid communication with the fluid passages 21p, 25p, 23p, and 27p, respectively, by means of annular grooves formed on the outer surface of the sleeve valve 33, as is well known in the art, but which are not shown in FIGS. 5 and 6.

OPERATION

Referring now primarily to FIGS. 1 and 5, when there is no steering input by the operator, and the spool 31 and sleeve 33 are in their relative neutral position (as shown in FIG. 4 and described previously), the spool and sleeve are in the relative position shown in FIG. 5. Pressurized fluid enters the inlet port 21 and flows through the fluid passage 21p, then into the recesses 65, then to the left in FIG. 5 through the axial slots 71. In the neutral position of the spool and sleeve, and as may be seen in FIG. 5, the elongated opening 89 in the sleeve overlaps both the axial slot 71 and the power beyond slot 77, the cumulative area of overlap of these pairs of orifices comprising a variable neutral orifice $A_N$. Thus, pressurized fluid passes through the $A_N$ orifice, then flows from the power beyond slots 77 through the power beyond ports 95 in the sleeve, then out through the fluid passage 27p to the power beyond port 27. This pressurized fluid is available for use in a downstream hydraulic function, elsewhere on the vehicle.

As the vehicle operator begins to rotate the spool 31 in the clockwise direction, (i.e., the spool moves "upward" in FIG. 6), the area of overlap of the elongated openings 89 and the slots 71 and 77 begins to decrease, until the spool and sleeve reach an "operating" position as shown in FIG. 6 in which the variable neutral orifice $A_N$ is closed. Those skilled in the art will recognize that the variable neutral orifice $A_N$ is "closed" when, for example, the elongated opening 89 is wide open to the axial slot 71, but is out of communication with the power beyond slot 77, or vice versa.

In the operating position of FIG. 6, pressurized fluid from the inlet port 21 flows through the pressure ports 85 in the sleeve and into the recesses 65 in the spool, the area of overlap therebetween comprising a main variable flow control orifice A1. As is well known to those skilled in the art, in an open center or power beyond type of fluid controller, the A1 orifice is, in reality, a fixed, wide open orifice, and rather than controlling flow entering the controller by displacing the spool and sleeve, the operator controls the buildup of pressure entering the controller by closing off the variable neutral orifice $A_N$.

As pressure builds, fluid flows through the axial slots 69 which now overlap every other one of the meter ports 87, the cumulative area of overlap therebetween comprising a variable flow control orifice A2. Fluid in the meter ports 87 flows through appropriate ones of the angled bores 55 to the expanding volume chambers 51, causing orbital and rotational is motion of the star 39. Metered fluid then flows from the contracting volume chambers 51 through the appropriate ones of the angled bores 55 to the alternating meter ports 87 which overlap the long axial slots 73, the cumulative area of overlap therebetween comprising a variable flow control orifice A3.

Metered fluid entering the long slots 73 flows axially almost the entire length of the spool 31, and toward their left end, the slots 73 overlap the operating ports 93, the cumulative area of overlap therebetween comprising a variable flow control orifice A4. Metered fluid then flows through the operating ports 93 and through the fluid passages 23p to the control port 23, and from there to the vehicle steering cylinder C to effect a right turn of the vehicle.

Fluid exiting the steering cylinder C returns to the control fluid port 25 then flows through the fluid passage 25p to the operating ports 91, which now overlap the short axial slots 75, the cumulative area of overlap therebetween comprising a variable flow control orifice A5. Return fluid entering the short slots 75 then flows through the radial bores 81 in the spool 31, entering the fluid passage 22p and then flowing to the left in FIGS. I and 6 and then out the return port 22 to a system reservoir. Although most of the fluid in the fluid passage 22p flows to the return port 22, a certain amount is available to flow to the right in FIG. 1, then out through a radial bore 97 to lubricate both a forward thrust bearing set 99 and the engagement of the teeth 41 and 43.

Thus, the present invention provides an improved fluid controller which greatly simplifies the follow-up mechanism by eliminating the need for the conventional drive shaft and transverse pin, thereby substantially reducing the cost of the controller. The elimination of the drive shaft makes it possible for the inside diameter of the spool valve to be substantially smaller, such that it can either have a greater wall thickness to prevent pressure "crush" and leakage, or it can have a smaller outside diameter, in which case the sleeve can also have a smaller diameter, and the entire controller can be smaller. The design of the present invention also makes it more feasible to increase the case pressure. In the subject embodiment of the invention being developed, case pressures as high a 800 psi. have been acceptable.

The present invention makes it possible to put the fluid meter 15 toward the "front end" of the controller, and as a result, the fluid ports 21, 22, 23, 25, and 27 may be formed in the housing, at the rearward end of the controller. The elimination of the conventional follow up mechanism means that at least part of the opening at the center of the star is available, such as to locate the thrust bearing set 99. This arrangement makes it possible to greatly simplify the end cover, thus making it substantially less expensive.

Although the present invention has been illustrated and described in connection with an embodiment in which the fluid meter is disposed toward the front end of the controller, the invention is not so limited. Especially if the porting were located on the outside of the valve housing, rather than in an end surface, the fluid meter could be disposed toward the rearward end of the controller. In that case, the centering spring arrangement could be either toward the rearward end, as shown in FIG. 1, and adjacent the fluid meter, or it could be disposed toward the forward end, which is the more conventional location.

Furthermore, although the present invention has been illustrated and described in connection with an embodiment having certain valving features, those skilled in the art will understand that the invention is not so limited. The teaching of the invention could be utilized in a fluid controller having valving which is open center (or power beyond, as in the subject embodiment), or which is closed center, or which is load sensing.

Referring again to FIG. 3, those skilled in the art will understand that many fluid controllers of the type to which the invention relates are required to have manual steering capability, such that, if hydraulic power is lost, when the vehicle operator turns the steering wheel, the fluid meter 15 functions as a fluid pump, and generates sufficient flow of pressurized fluid to achieve steering on an "emergency" basis. In view of the requirement for manual steering, it is believed to be within the ability of those skilled in the art of gearing to specify a profile for the teeth 41 and 43 which is appropriate, such that, when the sleeve 33 rotates, the external teeth 43 will drive the internal teeth 41, and cause orbital and rotational movement of the star 39. If, under manual steering conditions, the result is that the star 39 wedges or jams within the ring 37, and doesn't orbit and rotate, it will be necessary to modify the profile of the teeth 41 and 43.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means and comprising a primary, rotatable valve member and a cooperating, relatively rotatable follow-up valve member, said primary and follow-up valve members defining a neutral position and a rotary operating position in which said primary and follow-up valve members are relatively rotatably displaced; said housing means and said valve means cooperating to define a main fluid path communicating between said inlet port and said first control fluid port, and between said second control fluid port and said return port when said valve members are in said rotary operating position; fluid actuated means for imparting follow-up movement to said valve means proportional to the volume of fluid flow therethrough, said fluid actuated means including a stationary, internally toothed ring member, and an externally toothed star member having rotational movement relative to said ring member; characterized by:

(a) said follow-up valve member including a terminal portion disposed immediately adjacent said externally toothed star member; and (b) said star member and said terminal portion of said follow-up valve member including coupling means operable, in response to said rotational movement of said star member, to transmit a rotational follow-up movement to said follow-up valve member.

2. A controller as claimed in claim 1, characterized by said follow-up valve member comprising a cylindrical sleeve valve member disposed radially between said primary valve member and said housing means.

3. A controller as claimed in claim 1, characterized by said externally toothed star member has orbital and rotational movement within said internally toothed ring member, said coupling means being operable to translate said orbital and rotational movements of said star member into said rotational follow-up movement of said follow-up valve member.

4. A controller as claimed in claim 1, characterized by said terminal portion of said follow-up valve member extending axially at least partly through a central opening defined by said star member.

5. A controller as claimed in claim 4, characterized by said coupling means comprises said central opening of said star member defining a set of internal teeth, and said terminal portion of said follow-up valve member defining a set of external teeth in operable engagement with said set of internal teeth.

6. A controller as claimed in claim 5, characterized by the number of said internal teeth being equal to the number of said external teeth.

7. A controller as claimed in claim 1, characterized by said internal teeth and said external teeth being configured such that rotation of said follow up valve member results in orbital and rotational movement of said star member within said ring member, and the pumping of pressurized fluid thereby.

8. A controller as claimed in claim 1, characterized by said terminal portion of said follow-up valve member comprises a forward terminal portion, and said fluid actuated means is disposed toward a forward end of said controller, said follow-up valve member and said housing means cooperating to define commutating valve means, communicating fluid to and from said fluid actuated means.

9. A controller as claimed in claim 8, characterized by said primary and follow-up valve members including rearward terminal portions, said controller including spring means operably associated with said rearward terminal portions of said primary and follow-up valve members, to bias said follow-up valve member toward said neutral position relative to said primary valve member.

10. A controller as claimed in claim 8, characterized by said housing means comprising a valve housing disposed immediately adjacent said fluid actuated means, and rearward thereof, and surrounding said primary and follow up valve members, said valve housing defining said inlet port, and said first and second control fluid ports.

* * * * *